United States Patent [19]

Meier

[11] Patent Number: 4,547,941
[45] Date of Patent: Oct. 22, 1985

[54] METHOD FOR REPAIRING HOUSINGS OF PUMPS AND THE LIKE

[75] Inventor: Gudrun Meier, Karlsruhe, Fed. Rep. of Germany

[73] Assignee: Soudbrase-Schweisstechnik GmbH, Karlsruhe, Fed. Rep. of Germany

[21] Appl. No.: 473,745

[22] Filed: Mar. 9, 1983

[30] Foreign Application Priority Data

Mar. 18, 1982 [DE] Fed. Rep. of Germany ....... 3209917

[51] Int. Cl.⁴ .............................................. B23P 15/00
[52] U.S. Cl. ............................ 29/156.4 R; 29/402.12; 29/402.14; 29/402.15; 29/402.18; 29/527.5; 29/530; 29/402.01; 29/402.09; 164/92.1; 264/36; 264/227; 264/267; 264/269; 415/196; 415/DIG. 5
[58] Field of Search ............ 29/156.4 R, 527.3, 527.5, 29/530, 402.01, 402.09, 402.10, 402.11, 402.12, 402.14, 402.15, 402.18; 164/34, 35, 36, 45, 92.1; 264/36, 225, 226, 227, 265, 267, 269; 415/196, DIG. 5

[56] References Cited

U.S. PATENT DOCUMENTS

| | | | |
|---|---|---|---|
| 1,397,167 | 11/1921 | Hopper | 29/156.4 R |
| 2,252,986 | 8/1941 | Scott | 29/402.11 |
| 2,369,415 | 2/1945 | Sherman | 29/156.4 R |
| 3,136,044 | 6/1964 | Funk et al. | 29/156.4 R |
| 3,229,361 | 1/1966 | Valacich | 29/402.18 X |
| 3,934,107 | 1/1976 | Evertz | 29/402.15 X |
| 4,231,982 | 11/1980 | Jansson | 264/225 X |

Primary Examiner—Howard N. Goldberg
Assistant Examiner—Ronald S. Wallace
Attorney, Agent, or Firm—Peter K. Kontler

[57] ABSTRACT

The cast iron housing of a pump for conveying gravel or the like can be repaired by inserting into a recess in its internal surface a casting which at least substantially fills the recess. The recess develops as a result of washout, cavitation and/or other influences when the housing is in use. The casting is obtained by pouring molten metal into an impression which is formed in a mold by a pattern obtained by filling the recess with a hardenable plastic surface. The impression is overlapped by a cover having a surface which is complementary to the internal surface of the housing, and such cover is used for admission of molten metal as well as for escape of air from the impression. The casting is fastened to the housing by bolts portions of which are embedded in the casting during pouring of molten metal and extend through complementary holes of the housing or through the deepmost portion of the recess if the latter extends all the way between the internal and external surfaces of the housing. In addition to or in lieu of mechanical fasteners, the casting can be secured to the housing by adhesive. A seal can be inserted between the casting and the housing so as to prevent leakage of flowable substances into the recess around the casting. A casting can be removed after a certain period of wear to be replaced with a fresh casting so that the useful life of the housing can be extended beyond the useful life of a single casting.

17 Claims, 9 Drawing Figures

METHOD FOR REPAIRING HOUSINGS OF PUMPS AND THE LIKE

BACKGROUND OF THE INVENTION

The present invention relates to housings of pumps and like devices which are used for conveying sand, gravel and/or other flowable solid or liquid substances which are likely to affect the integrity of the housing as a result of pronounced wear, erosion, washout, cavitation and/or other factors or influences. More particularly, the invention relates to such housings as well as to a method and an apparatus for repairing damages which arise in such housings as a result of the aforediscussed influences.

Pumps which are used in gravel pits and elsewhere to convey sand, gravel or like materials, normally in admixture to water or another suitable carrier fluid, are subject to extensive wear as a result of repeated pronounced rubbing contact with the particles of conveyed material. The wear is particularly pronounced in certain portions of the pump housing, and such portions develop recesses which can constitute mere cavities in the material-contacting internal surface or holes which extend all the way between the internal and external surfaces of the housing. As a rule, the housing of a sand pump is a casting which cannot be readily repaired by welding or an analogous material-adding technique. Therefore, the useful life of such housings is determined by the dimensions of the recess or recesses in the material-contacting surface of the housing. The housing must be discarded as soon as the dimensions of the recess are such that the recess allows conveyed material to escape from the housing in a region other than the intended outlet or outlets, or that the recess accumulates a quantity of material which interferes with the flow of freshly admitted material through the housing. In many instances, the entire pump must be discarded when the housing is discarded with attendant high costs for removal of a useless pump, purchase of a new pump, and installation of the new pump.

It was already proposed to resurface a damaged (pitted) housing by resort to build-up welding or similar techniques. The welding operation should result in the deposition of a substantial quantity of material in the recess, and the surplus of the welded-on material is to be removed by grinding. Such proposals have met with no success and have failed to gain acceptance by the manufacturers and/or users of sand pumps or the like because a cast metal, of which the housings of such devices are normally made, does not retain the material which is to be added thereto by build-up welding.

OBJECTS AND SUMMARY OF THE INVENTION

An object of the invention is to provide a novel and improved method of effectively and inexpensively repairing the housing of a pump or a like device which is used to convey sand, gravel and/or other erosive and/or corrosive materials likely to cause the housing to develop recesses of a size and/or depth which suffices to warrant repair or, in the absence of repair, replacement of the affected housing with a new housing.

Another object of the invention is to provide a novel and improved method of filling in recesses which develop in the material-contacting surface of a housing forming part of a pump for conveying sand, gravel or the like.

A further object of the invention is to provide a method which can be used to fill in the aforementioned recesses irrespective of the nature of the material of the housing.

An additional object of the invention is to provide a method which is simple and inexpensive, which can restore a damaged housing for extended further use and which ensures that the repaired housing is just as satisfactory as a new housing.

Still another object of the invention is to provide a novel and improved method of repairing cost iron housings of sand pumps or the like without resort to welding or similar material adding techniques.

A further object of the invention is to provide a method which can be resorted to irrespective of the locus and accessibility or absence of ready accessibility of the recess or recesses in the housing.

Another object of the invention is to provide a method which can be repeated again and again so that the useful life of a housing can be multiplied at a total cost which is a fraction of the cost of a new housing.

An additional object of the invention is to provide a novel and improved apparatus for the practice of the above outlined method.

Another object of the invention is to provide an apparatus which is relatively simple and inexpensive, which can be used for the making of repairs on a wide variety of differently dimensioned and/or configurated housings, and which can be reused as often as desired, either to repeatedly repair one and the same housing or type of housing, or to repair different types, makes or sizes of housings.

An additional object of the invention is to provide an apparatus which can prolong the useful life of a damaged housing for periods of time which are a multiple of the useful life of the housing in the absence of repair.

Still another object of the invention is to provide an apparatus which can be readily transported to the locale of use of the housing so that the housing need not even be removed from the installation where it is used to convey erosive or other aggressive substances between two pipelines, into a pipeline, into a reservoir or to another destination.

A further object of the invention is to provide a novel and improved housing which is repaired in accordance with the above outlined method and/or with resort to the above outlined apparatus.

An ancillary object of the invention is to provide an insert for introduction into the recess of a housing which forms part of a same pump or the like.

One feature of the invention resides in the provision of a method of repairing a housing, particularly the housing of a pump for conveying sand, gravel or the like, which has developed a recess as a result of wear, erosion, washout, cavitation and/or similar influences. The method comprises the steps of making a pattern which fits into and at least substantially fills the recess, utilizing the pattern to form an impression thereof in a mold (e.g., in a mold which contains a supply of casting sand), pouring into the impression a hardenable molten substance (e.g., a metallic substance, such as white cast iron, gray cast iron (particularly GG 22), a titanium-containing alloy, a chromium-containing alloy or an alloy which contains manganese) to thus produce a casting which is a replica of the pattern, inserting the casting into the recess, and fastening the inserted casting to the housing. As a rule, the recess develops in an internal surface of the housing which is contacted by the conveyed material. A further step of the method can comprise covering the impression in the mold by a closure or lid having a surface corresponding to that portion of the internal surface of the housing in which the recess is formed (i.e., which is absent as a result of development of a recess therein); this ensures that the exposed surface of the inserted casting is at least substantially flush with the surrounding portion of the internal surface of the housing.

The method can further comprise the step of inserting into the impression of the mold at least one anchoring element prior to the pouring step so that the anchoring element is partially embedded in the casting. The fastening step can comprise utilizing the non-embedded part of the anchoring element to secure the casting to the housing. Alternatively, the fastening step can include adhesively bonding the casting to the housing. Still further, the method can comprise the step of inserting into the recess a seal prior to insertion of the casting, and the fastening step then preferably comprises compressing the seal between the inserted casting and the housing so that the conveyed material and/or air cannot penetrate into the recess between the casting and the housing and/or that the seal prevents escape of conveyed material from the housing if the recess is a hole or cavity which extends all the way between the internal and external surfaces of the housing. The pattern making step can comprise making a pattern whose volume is less than the quantity of material that is needed to fill the recess by an amount corresponding to the volume of the seal so that the casting and the seal together fill the recess.

The fastening step can comprise making in the housing at least one hole (e.g., by resort to an electric flame boring technique) which communicates with the recess, and inserting into the hole a portion of an anchoring element which secures the casting to the housing. Such portion of the anchoring element can constitute the aforementioned non-embedded part of the anchoring element a part of which is embedded in the casting. The anchoring element is inserted into the impression in such position and orientation that its non-embedded part automatically enters the hole when the casting is properly inserted into the recess. The hole preferably extends between the recess and the aforementioned external surface of the housing, and the non-embedded part of the anchoring element preferably extends outwardly beyond the external surface when the casting is properly inserted into the recess. The fastening step then further comprises affixing a retaining member (e.g., a nut) to the exposed part of the anchoring element at the external surface of the housing. A reinforcing member (e.g., a plate) can be interposed between the retaining member and the external surface of the housing.

The method preferably further comprises the step of establishing a smooth transition between the internal surface of the housing around the recess and the adjacent portion of the inserted casting. Such transition establishing step can include grinding the casting and/or the surrounding portion of the housing.

Still further, the method can comprise the step of hardening at least a portion of the casting, either prior or subsequent to insertion of the casting into the recess. For example, the hardening step can comprise surface hardening the casting in the region which is exposed upon insertion of the casting into the recess, i.e., in the region where the casting is contacted by conveyed material when the repaired housing is put to renewed use. For example, the hardening step can comprise abruptly removing heat from that portion of the casting which is exposed upon completion of the inserting step. This can be achieved by covering the impression with a closure or lid whose mass or bulk is substantial and whose material is good or excellent conductor of heat so that the lid withdraws a substantial quantity of heat from the adjacent portion of the finished casting.

Another feature of the invention resides in the provision of a device (particularly in a pump) for conveying sand, gravel and/or like materials. The device comprises a housing having a material-contacting surface (normally the internal surface of a pump housing or valve housing) and a recess which is provided in such material-contacting surface as a result of washout, other wear, erosion, cavitation and/or other influences, a casting (which is preferably produced in accordance with the aforedescribed method) installed in and at least substantially filling the recess, and means for fastening the casting to the housing. The housing can consist, at least in part, of white cast iron. The exposed surface of the properly inserted casting at least substantially matches that part of the material-contacting surface of the housing which is provided with the recess, i.e., the exposed surface of the inserted casting can be said to be a continuation of the adjacent (surrounding) portion of the material-contacting surface of the housing.

The fastening means can comprise a first portion (such as the embedded part of the aforementioned anchoring element) which is embedded in the casting and a second portion which is secured to the housing to thereby connect the latter with the casting. The second portion of the fastening means can comprise at least one bolt or an analogous externally threaded member, and the housing can have a hole for reception of such externally threaded member. The first portion of the fastening means can comprise a bridge which is at least substantially embedded in the casting, and the second portion of the fastening means can comprise a plurality of externally threaded members which are rigid with the bridge and hence with the casting; the housing is then provided with a discrete hole for each such externally threaded member. If the casting is elongated, the aforementioned bridge is also elongated and is disposed longitudinally of the casting so that the externally threaded members can be distributed along the length of the casting. The hole or holes preferably extend all the way from the recess to the external surface of the housing, and each externally threaded member of the fastening means can extend through the respective hole and beyond the external surface of the housing to take a nut or other suitable retaining means which prevents extraction of the casting from the recess.

As mentioned above, at least a portion of the casting preferably consists of a metallic material, such as cast iron or an alloy containing manganese, chromium, titanium and/or other substances which promote the resistance of the casting to wear, cracking, corrosion and/or other influences which could cause premature wear of the casting. As also mentioned above, at least that portion of the casting which is exposed when the casting is properly fastened to the housing is hardened to prolong the useful life of the casting. The aforementioned seal can be interposed between the casting and the housing in the recess of the material-contacting surface to reduce the likelihood of penetration of conveyed material and/or air into between the casting and that portion of the material of the housing which bounds the recess. The seal need not contact each and every portion of that part of the casting which is received in the recess; for example, the seal can be inserted only into the deepmost portion of the recess to prevent corrosive or erosive substances from deepening that part of the recess which is nearest to the external surface of the housing.

Alternatively, the fastening means can comprise a layer of adhesive which is disposed in the recess between the housing and the casting.

The hardening step can be dispensed with by using fastening means which allows for separation of the casting from the housing so that the casting can be replaced with a fresh casting after a certain period of pronounced wear. This also holds true for fastening means in the form of an adhesive layer; such layer can be heated to a temperature at which it ceases to bond a worn or otherwise damaged casting to the housing. Of course, the hardening step can be carried out even though the fasting means allows for separation of the casting; this ensures that the casting must be replaced at less frequent intervals.

A further feature of the invention resides in the provision of an apparatus for repairing the housing of a pump or the like, particularly the housing of a device for conveying sand, gravel and like substances which can cause the housing to develop a recess as a result of wear, erosion, cavitation, washout and/or other influences. The apparatus comprises a pattern which can at least substantially fill the recess and can be made of wax or any other hardenable substance which is introduced into the recess so as to fill the same and is removed after hardening so that it constitutes a replica of the material which has been removed from the housing during the development of the recess (such recess is normally located in the internal surface of the housing, namely, in a surface which is contacted by the conveyed material). The apparatus further comprises a mold into which the pattern can be embedded to form an impression which at least closely resembles the recess of the housing, and a cover or closure for the impression. The cover has a surface which is arranged to overlie the impression in the mold and is a replica of that portion of the material-contacting surface of the housing in which the recess is formed. The mass of the cover preferably greatly exceeds the mass of the pattern, and the cover can be made of a heat-conducting material so that it can withdraw large quantities of heat from a casting which is obtained by pouring a molten substance into the covered impression in the mold. To this end, the cover can be formed with at least one first channel for introduction of a molten substance into the impression and with at least one second channel which permits air to escape from the impression during pouring of molten substance into the mold. The mold can contain a supply of casting sand which allows for the making of an accurate impression of the pattern with a minimum of effort.

The apparatus can further comprise prefabricated anchoring or fastening means having a first portion which is insertable into the impression of the pattern in the sand and a second portion which is to penetrate into the sand so that the first portion is embedded in the material of the casting which is obtained as a result of pouring molten metal or the like into the impression whereas the second portion of the anchoring means extends from the casting and can be utilized to fasten the casting to the housing upon insertion of the casting into the recess.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2, 3:
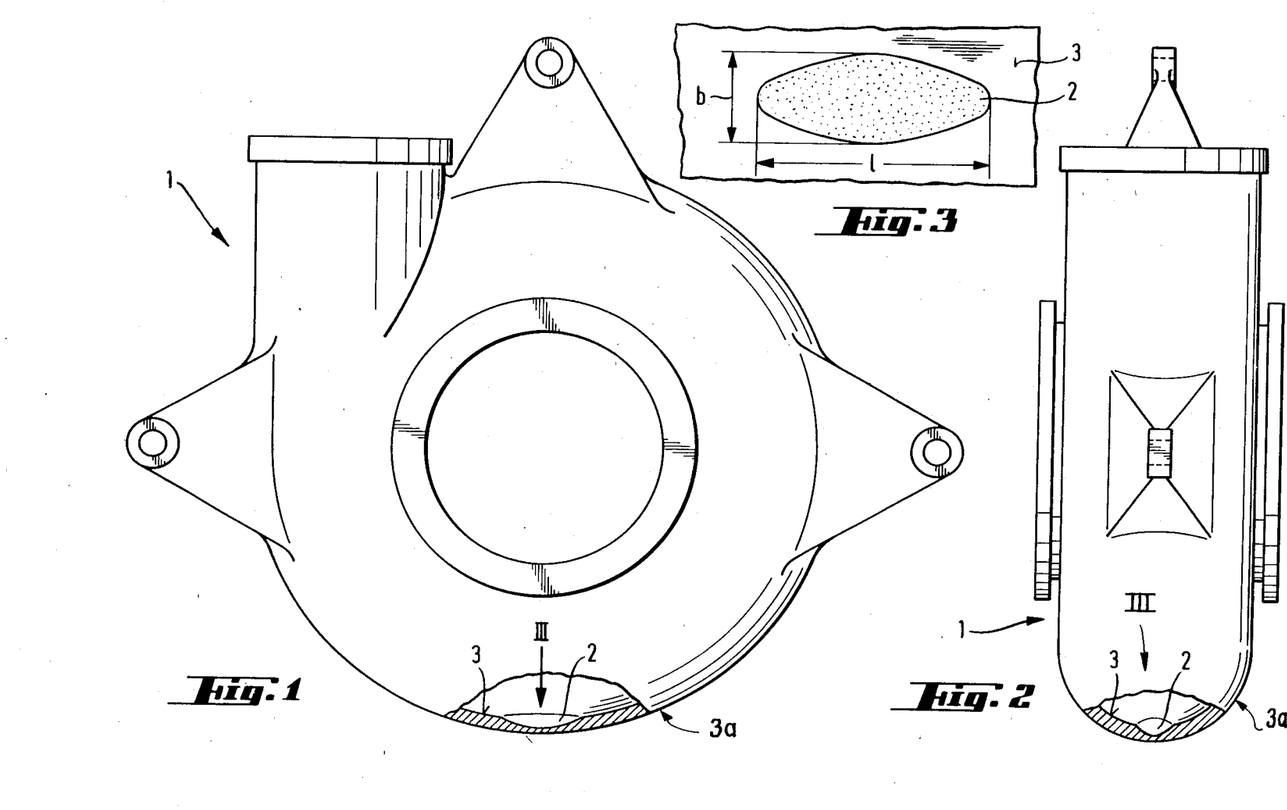
FIG. 1 is a schematic side elevational view of the housing of a centrifugal pump, a portion of the housing being broken away to expose a part of the concave internal surface which exhibits a recess as a result of washout, erosion, wear, cavitation or a similar influence.
FIG. 2 is an end elevational view of the housing as seen from the left-hand side of FIG. 1, with a portion of the housing again broken away to expose the recess in its internal surface.
FIG. 3 is an enlarged fragmentary plan view of that portion of the internal surface of the housing which exhibits the recess, the view being taken in the direction of arrow III in FIG. 2 and the area of the recess being accentuated by vertical hatching.

FIGS. 1 and 2 show a housing 1 which forms part of a centrifugal pump of the type often employed for conveying sand or gravel in admixture to water or another suitable liquid carrier medium. The conveyed material contacts the internal surface 3 of the housing 1 and is likely to attack the material of the housing, normally a white cast iron. FIGS. 1 and 2 show a recess 2 which is formed in the internal surface 3 as a result of washout, other wear, erosion, cavitation and/or similar influences. Such recess can develop after a relatively short period of use of the pump which includes the housing 1. The dimensions of pumps which are used for conveying sand or the like can vary between small and very large.

Figure 8:
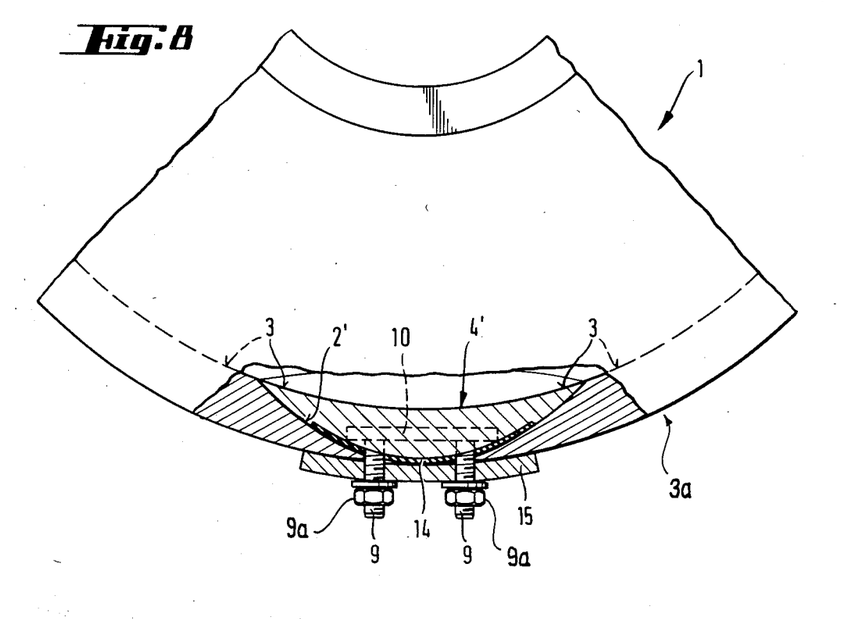
FIG. 8 is a view similar to that of FIG. 7 but showing different fastening means for the casting which fills a recess extending all the way between the internal and external surfaces of the housing.
Figure 9:
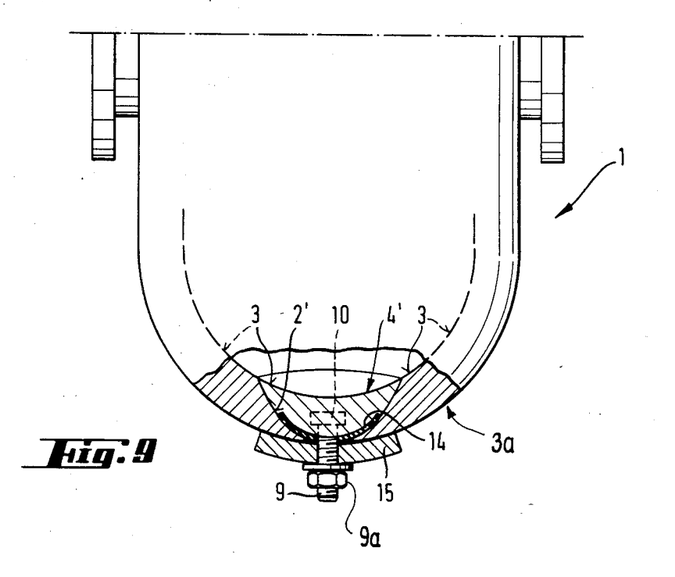
FIG. 9 is a fragmentary end elevational view of the housing which is shown in FIG. 8, with a portion broken away to expose the casting in the recess of the internal surface.

For example, in a large pump, the recess 2 in the internal surface 3 can reach a length l (FIG. 3) of approximately 50 cm and a width b of approximately 20 cm. In fact, the wear upon the internal surface 3 can be so pronounced that the recess or cavity 2 actually constitutes a hole which extends all the way from the internal surface 3 to the external surface 3a of the housing 1 (note the recess 2' in the housing 1 which is shown in FIGS. 8 and 9). Thus, in the absence of any remedial action, the conveyed material will escape from the interior of the pump by way of the recess 2' to contaminate the surrounding area, to flood the surrounding area and to prevent the pump from delivering sand, gravel or the like at the required rate.

In heretofore known sand pumps and the like, a damage to the housing 1 which amounted to the development of a relatively large recess 2, and particularly a recess 2' which extends all the way between the material-contacting internal surface 3 and the external surface 3a, necessitated replacement of the housing with a new housing. As mentioned above, the housing 1 is normally a casting which cannot be repaired by welding. In accordance with the present invention, the housing 1 can be readily repaired at a reasonable cost and as often as desired by resort to a method which can be practiced with an apparatus including the parts shown in FIGS. 4 and 5.

The improved method involves the insertion and fastening in the recess 2 of a filler 4 (note FIGS. 6 and 7) which is a preferably metallic casting and is formed and secured to the housing 1 as follows:

In the first step, the internal surface 3 in the region of the recess 2 of the housing 1 is cleaned by a brush having metallic bristles to remove any loose and/or readily separable fragments of the material of the housing. The thus treated surface portion bounding the recess 2 is thereupon sprayed with a suitable parting compound, e.g., a paraffin spray, which ensures that a substance which is thereupon introduced into the recess 2 does not adhere to the housing 1. Such substance is used to make a pattern, i.e., a replica of the mass of material which has been removed by wear or for other reasons to develop the recess 2. The substance which is used to make the pattern may consist of gypsum in plastic state or any other hardenable plastic mass which can be shaped so as to completely or substantially completely fill the recess 2. The plastic material can be introduced without considering the shape of the internal surface 3. If the dimensions of the recess 2 are large, it is advisable to resort to one or more reinforcing elements which are inserted into the recess to enhance the rigidity of the pattern which is obtained as a result of hardening or setting of plasticized material that fills the recess. The pattern is removed from the recess as soon as its material sets sufficiently to ensure that it can be withdrawn without any deformation such as would prevent the making of a casting 4 which can adequately fill the recess 2. It is clear that, if the configuration of the recess 2 is such that certain portions thereof can be filled with a plastic mass but that the hardened mass cannot be removed from such portions, the corresponding parts of the recess can be enlarged by a torch or the like so as to ensure that the pattern can adequately fill the recess and can be readily withdrawn therefrom as soon as its material sets.

The finished pattern is thereupon used to make an impression 6 in a supply of casting or foundry sand 5 which is confined in a suitable mold 7 and is of such consistency that the impression 6 is an exact or at least adequate replica of the cavity 2 in the internal surface 3 of the housing 1.

Figure 4:
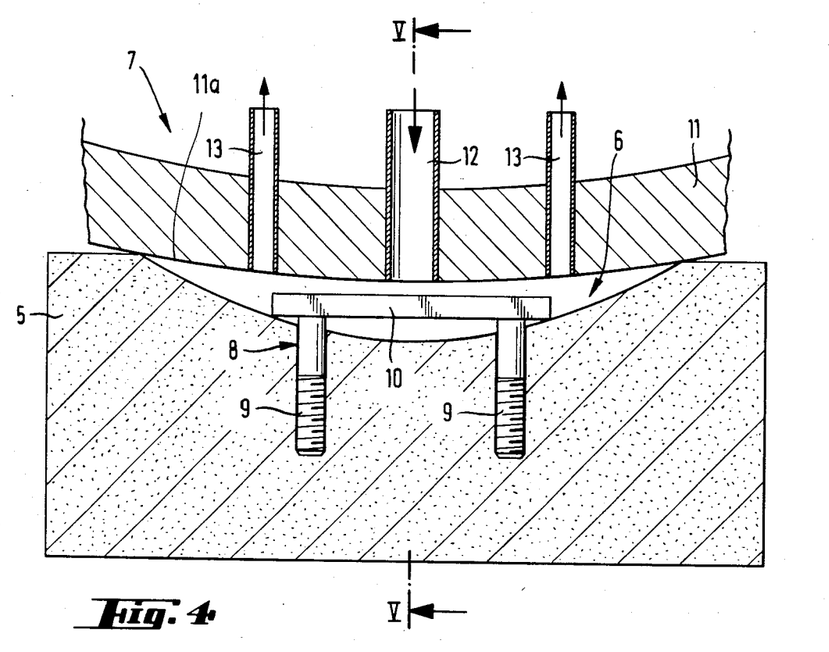
FIG. 4 is a fragmentary longitudional sectional view of an apparatus for the practice of the method, further showing an anchoring element a first portion of which is confined in the impression of a pattern in the body of casting sand within a mold and a second portion of which is embedded in the sand.
Figure 5:
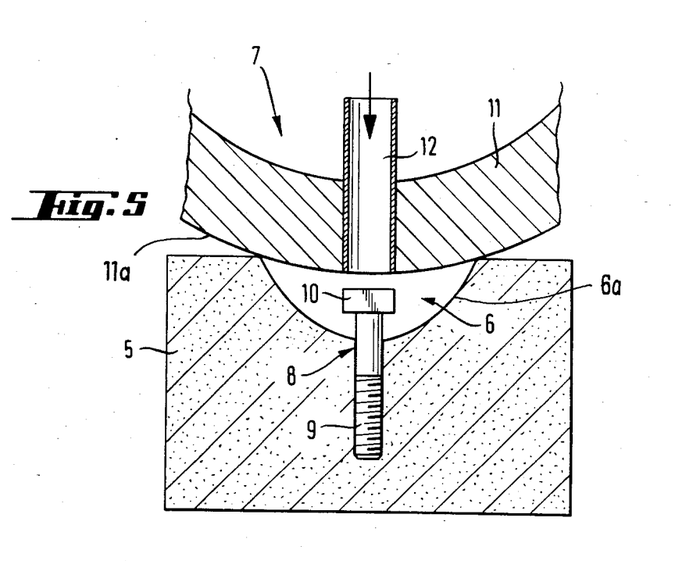
FIG. 5 is a sectional view as seen in the direction of arrows from the line V—V of FIG. 4.

In accordance with a feature of the method, the impression 6 can accommodate a first portion of an anchoring or fastening device 8 while a second portion of such anchoring device extends into the supply of casting sand 5. In the embodiment which is shown in FIGS. 4, 5, 6 and 7, the anchoring device 8 includes a bridge-like first portion 10 which extends longitudinally of the elongated impression 6, and a second portion consisting of two bolts 9 or analogous externally threaded members whose externally threaded ends are embedded in the supply of sand 5. The heads of the bolts 9 are rigidly secured to the bridge 9, and the two bolts are preferably adjacent to the two longitudinal ends of the impression 6, i.e., they are disposed at a considerable distance from one another to promote the fastening action of the device 8 when the bridge 9 is embedded in the material of a casting 4 which is obtained in response to pouring of a molten substance into the impression, e.g., through a centrally located pouring channel 12 provided in a cover or lid 11 constituting a closure for the open upper side of the impression 6. The convex underside or surface 11a of the cover 11 is preferably complementary to the concave internal surface 2 of the housing 1 in the region of the recess 2. Thus, when the cover 11 is caused to overlie the impression 6 in a manner as shown in FIGS. 4 and 5, the dimensions of the impression 6 match or very closely approximate the dimensions of the recess 2. As can be seen in FIGS. 4 and 5, the underside 11a of the cover 11 is spaced apart from the bridge 10. The latter is preferably inserted into the deepmost portion of the impression 6 so that the distance between the externally threaded portions of the bolts 9 and the concave surface 6a bounding the impression 6 in the sand 5 at least approximates the thickness of the housing 1 between the surfaces 3 and 3a. The dimensions of the anchoring device 8 and the number of bolts 9 will depend on the dimensions of the recess 2 as well as on the thickness of the housing 1 and the magnitude of the force with which the casting 4 is to be fastened to the housing.

The entire underside or surface 11a of the cover 11 need not be complementary to the internal surface 3 of the housing 1; it suffices if such surfaces are complementary to each other to the extent which is necessary to ensure that the portion of the surface 11a which overlies the impression 6 conforms to the "missing" portion of the internal surface 3, namely, to that portion of the internal surface in which the recess 2 was formed under the influence of conveyed material. The cover 11 is preferably bulky and its material is preferably a good conductor of heat to ensure rapid cooling of the adjacent portion of the casting 4. The cover 11 is formed with two additional channels 13 which permit escape of air from the impression 6 during admission of molten metal or other suitable hardenable molten material into the impression via channel 12. The cover 11 can be provided with more than one channel 12 and with a single channel 13 or with three or more channels 13, depending on the dimensions of the impression 6.

The cover 11 can be used in an apparatus for repairing identical housing 1 irrespective of the exact dimensions of the recesses 2 in different housings. To this end, the mass of the cover 11 should be sufficiently large to allow for rapid removal of heat from the adjacent portion of a large or small casting, and its surface 11a should be sufficiently large to properly overlie large, medium-sized or small impressions 6. A properly placed cover 11 is held in such position that it does not allow for escape of molten material along the edges of the surface 6a bounding the impression 6. This is clearly shown in FIGS. 4 and 5. The molten material can be gray cast iron (such as GG 22) or any one of many other metallic substances including white cast iron and alloys containing manganese, tungsten or chromium, depending on the desired resistance to wear and/or other characteristics of the casting 4.

Figure 6:
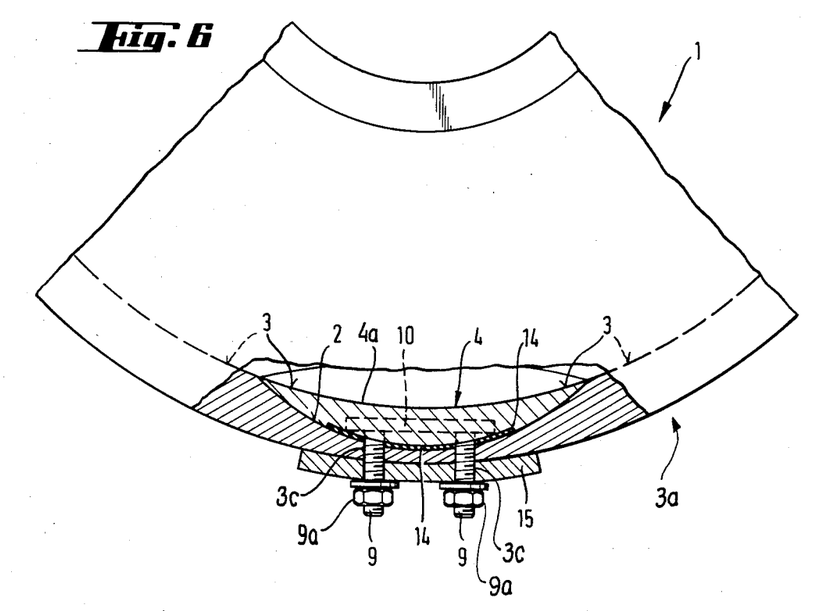
FIG. 6 is a fragmentary elevational view of the repaired housing, a portion of the housing being broken away to expose the casting which fills the recess and is fastened to the housing.
Figure 7:
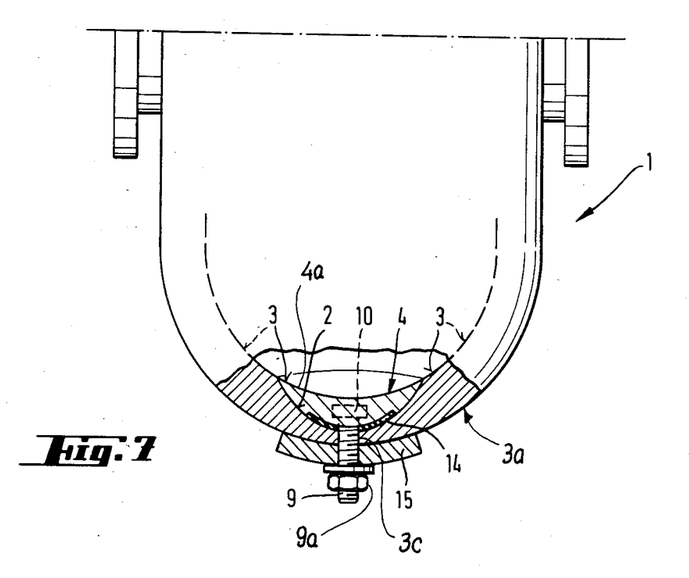
FIG. 7 is a fragmentary end elevational view of the repaired housing with a portion of the housing again broken away to expose the casting in the recess of the internal surface.

The freshly poured molten material hardens rapidly in the region of the surface 11a so that gray cast iron is converted into white cast iron which can stand pronounced wear much more readily than gray cast iron. Such surface hardening of the casting 4 often suffices to ensure long periods of use of the casting in the recess 2 of the housing 1. As can be seen in FIGS. 6 and 7, the surface-hardened portion of the casting 4 in the recess 2 comes in contact with the conveyed material whereas the non-hardened portion of the casting fills the major part of the recess and is held out of contact with the conveyed material.

The hardened casting 4 is removed from the impression 6 together with the anchoring device 8 whose bridge 10 is permanently embedded in the material of the casting and whose bolts 9 extend from the casting so that they can enter complementary holes or bores 3c which are machined into the housing 1 to extend between the recess 2 and the external surface 3a. The holes 3c can be made by resort to an electric flame boring electrode or the like. In lieu of the just mentioned electrode, one can also resort to an electric gouging blowpipe, not shown.

FIGS. 6 and 7 further show a suitable seal 14 which is inserted into the deepmost portion of the recess 2 prior to insertion of the hardened casting 4 so that the seal 14 is deformed and fills eventual gaps between the adjacent portions of the housing 1 and casting 4. The width of the seal 14 can exceed the width of the bridge 9 and its length can match or at least slightly exceed the length of the bridge. The seal 14 is formed with holes in register with the holes 3c of the housing 1, and such holes of the seal can sealingly receive portions of the bolts 9. These bolts extend through the respective holds 3c and beyond the external surface 3a to mate with nuts 9a to urge the casting 4 into the recess 2. A reinforcing plate 15 can be interposed between the nuts 9a and the external surface 3a; to this end, the plate 15 has holes in register with the holes or bores 3c so that the bolts 9 can extend through and beyond the reinforcing plate. The concave side of the plate 15 is preferably complementary to the adjacent portion of the external surface 3a of the housing 1.

The exposed surface 4a of the casting 4 in the recess 2 can be treated by a grinder, sander or another suitable tool so as to remove any burrs, flash or like projections and to provide a smooth transition between the surface 4a and the internal surface 3 around the recess 2. This completes the repair work and the housing 1 is ready for renewed used.

FIGS. 8 and 9 show a housing 1 with a recess or cavity 2' which extends all the way between the surfaces 3 and 3a. The mode of repairing such housing is practically identical with the aforedescribed method except that it is not always necessary to drill holes 3a (FIGS. 6 and 7) because the bolts 9 can extend through the innermost or deepmost portion of the recess 2' to thereupon pass through the holes of the seal 14 and the bores of the reinforcing plate 15. The exposed end portions of the bolts 9 mesh with nuts 9a which urge the reinforcing plate 15 against the external surface 3a and simultaneously urge the casting 4' into the recess 2' so that the casting compresses the seal 14. As a rule, the dimensions of the reinforcing plate 15 and seal 14 will be greater if the recess extends all the way between the internal and external surfaces of the housing. This reduces the likelihood of leakage of flowable materials through the recess 2' is inserted position of the casting 5'.

It is equally within the purview of the invention to replace the illustrated anchoring or fastening device 8 with a fastening means in the form of suitable adhesive paste which is applied to the casting 4 or 4' and/or to the internal surface 3 of the housing 1 to bond the casting to the material of the housing. Furthermore, an adhesive can be used in addition to mechanical fastening or anchoring means to further reduce the likelihood of premature separation of the casting from the housing and/or the penetration of flowable substances into the recess around the inserted casting. The adhesive can be used in lieu of the seal 14, i.e., the adhesive can constitute a seal which replaces a separately produced seal while simultaneously performing an additional desirable function, namely, that of bonding the casting to the housing 1. The reinforcing plate 15 can be bonded to the exposed surface 3a of the housing 1; such bonding by means of a suitable adhesive can be resorted to in lieu of but preferably in addition to using the nuts 9a.

The thickness and configuration of the seal 14 can be taken into consideration during the making of the aforementioned pattern. To this end, a seal can be inserted into the recess 2 or 2' prior to filling of the recess with a plastic mass so that the dimensions of the pattern are such that the pattern cannot completely fill the recess 2 or 2' but that the recess is completely filled when the casting 4 or 4' is inserted subsequent to insertion of the seal 14. The seal which is inserted into the recess 2 or 2' prior to introduction of a plastic substance which is to constitute the pattern is detached from the pattern after the latter sets so that the impression in the sand 5 is smaller than the recess 2 or 2', the difference amounting to the volume of the seal 14.

The provision of mechanical fastening means for the casting 4 or 4' exhibits the advantage that a casting can be removed from the respective recess 2 or 2' after a certain period of wear to be replaced with a fresh casting. Thus, the housing 1 can be used practically ad infinitum by the simple expedient of replacing a damaged or worn casting with a fresh casting. Two or more castings can be made one after the other, one for immediate insertion into the respective recess and the other or others to be stored for future use after the first used or previously used casting has undergone a maximum permissible amount of wear.

The provision of an adhesive bond between the casting and the housing 1 also allows for replacement of a damaged or spent casting with a fresh casting. All that is necessary is to heat the adhesive to a temperature which is sufficiently high to cause the adhesive to release the casting but is too low to cause any or any appreciable damage to the housing.

The repair work can be carried out in a workshop, in the plant which makes the housings, or at the locus of use of the device which employs the housing.

The improved method and apparatus can be used to repair a wide variety of housings, e.g., housings of pumps other than centrifugal pumps, valve housings and/or other housings which cannot be readily repaired in accordance with other techniques such as welding.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of repairing a housing, particularly the housing of a pump for conveying sand, gravel or the like, which has developed a recess as a result of wear, erosion, washout, cavitation and/or similar influences, comprising the steps of making a pattern which fits into and at least substantially fills the recess; utilizing the pattern to form an impression thereof in a mold; pouring into the impression a hardenable molten substance to thus produce a casting which is a replica of the pattern; inserting the casting into the recess; and fastening the inserted casting to the housing.

2. The method of claim 1 of filling a recess which develops in a surface of the pump housing, further comprising the step of covering the impression in the mold by a closure having a surface corresponding to that portion of the housing surface which is absent as a result of development of the recess therein.

3. The method of claim 1, further comprising the step of inserting into the impression of the mold at least one anchoring element prior to the pouring step so that the anchoring element is partially embedded in the casting, said fastening step comprising utilizing the non-embedded part of the anchoring element to secure the casting to the housing.

4. The method of claim 1, wherein said fastening step comprises adhesively bonding the casting to the housing.

5. The method of claim 1, further comprising the step of inserting into the recess a seal prior to insertion of the casting, said fastening step comprising compressing the seal between the casting and the housing.

6. The method of claim 5, wherein said first step comprises making a pattern whose volume is less than the quantity of material needed to fill the recess by an amount corresponding to the volume of the seal so that the seal and the casting together fill the recess in the housing.

7. The method of claim 1, wherein said fastening step comprises making in the housing at least one hole which communicates with the recess and inserting into the hole an anchoring element which secures the casting to the housing.

8. The method of claim 7, wherein said hole making step is carried out by resort to an electric flame boring technique.

9. The method of claim 7, further comprising the step of inserting the anchoring element into the impression prior to the pouring step in such orientation and position that a first portion of the anchoring element is embedded in the casting and a second portion of the anchoring element extends into the bore on insertion of the casting into the recess.

10. The method of claim 9, wherein the recess is formed in a first surface of the housing and the housing has a second surface opposite the first surface, the hole extending between the recess and the second surface of the housing and the second portion of the anchoring element extending beyond the second surface of the housing on insertion of the casting into the recess, said fastening step further comprising affixing a retaining member to the second portion of the anchoring element at the second surface of the housing.

11. The method of claim 10, wherein the fastening step further comprises interposing a reinforcing member between the retaining member and the housing.

12. The method of claim 1, wherein the housing has an inner side and an outer side and the recess is formed in the inner side of the housing, and further comprising the step of establishing a smooth transition between the inner side of the housing around the recess and at least the adjacent portion of the inserted casting.

13. The method of claim 12, wherein said transition establishing step comprises grinding the casting and/or the surrounding portion of the housing.

14. The method of claim 1, further comprising the step of hardening at least a portion of the casting.

15. The method of claim 14, wherein said hardening step comprises surface-hardening the casting in the region which is exposed upon completion of the inserting step.

16. The method of claim 14, wherein said hardening step comprises abruptly removing heat from that portion of the casting which is exposed upon completion of the inserting step.

17. The method of claim 16, wherein said heat removing step comprises covering the impression prior to the pouring step with a bulky closure of highly heat-conductive material.

* * * * *